US005979754A

United States Patent [19]

Martin et al.

[11] Patent Number: 5,979,754

[45] Date of Patent: Nov. 9, 1999

[54] DOOR LOCK CONTROL APPARATUS USING PAGING COMMUNICATION

[76] Inventors: Jay R. Martin; Scott E. Martin, both of 1735 Green Bay Rd., Highland Park, Ill. 60035

[21] Appl. No.: 08/823,323

[22] Filed: Mar. 21, 1997

Related U.S. Application Data

[63] Continuation-in-part of application No. 08/524,543, Sep. 7, 1995, Pat. No. 5,614,703.

[51] Int. Cl.[6] .......... G06K 5/00

[52] U.S. Cl. .......... 235/382; 235/375; 235/382.5

[58] Field of Search .......... 235/375, 382, 235/382.5

[56] References Cited

U.S. PATENT DOCUMENTS

| | | | |
|---|---|---|---|
| 5,046,084 | 9/1991 | Barrett et al. | 379/100 |
| 5,146,217 | 9/1992 | Holmes et al. | 340/825.44 |
| 5,247,160 | 9/1993 | Zicker . | |
| 5,614,703 | 3/1997 | Martin et al. | 235/382 |

OTHER PUBLICATIONS

Conlon, Michael, "Your credit card may be your hotel room key someday," Minneapolis *Star Tribune*, Sep. 8, 1994.

Reuters, "Hotel industry unlocks door to high–technology security," Chicago *Tribune*, Sep. 11, 1994.

*Primary Examiner*—Harold I. Pitts

*Attorney, Agent, or Firm*—Moore & Hansen

[57] ABSTRACT

A door control apparatus useable in buildings or other facilities having many locked doors or rooms and requiring controlled access to the rooms, utilizes paging transmitters and paging receivers to transmit information from a central control system to individual door control units located at each controlled door. The door control unit may include a card reader for reading an entry card. Card identification information is transmitted wirelessly from a main paging transmitter connected with the control system and is received by the door control units at selected doors to define the card or cards which are to be accepted at each door control unit to open a controlled door. The invention also allows all or selected doors to be unlocked by a transmitted command from the control system to allow fast entry through such doors to fire crews or other emergency personnel. The door control unit may also transmit data to the control system using paging technology.

12 Claims, 5 Drawing Sheets

DOOR LOCK CONTROL APPARATUS USING PAGING COMMUNICATION

This application is a continuation-in-part of application Ser. No. 08/524,543, filed Sep. 7, 1995, now U.S. Pat. No. 5,614,703 Mar. 25, 1997.

BACKGROUND OF THE INVENTION

This invention relates to the field of guest registration systems and door lock control apparatuses for places of lodging, such as hotels, motels, boarding houses, rooming houses, bed-and-breakfasts, and the like and to buildings or other facilities having numerous doors whose locks must be controlled. It relates to an improved registration system which handles most check-in and departure situations without the need for a desk clerk. It also includes a door lock control apparatus by which virtually any number of doors in a facility may be centrally controlled without the need for electrical wiring between the doors and a central control system.

In the lodging industry, and especially in the hotel and motel portions thereof, it has become commonplace to maintain computer records of guests and room availability. These records are constantly available to track the time that a guest stays at the place of lodging, the billing information for the guest, the room assignments and vacancies for the place of lodging, and other information. Such information is now usually entered manually by hotel employees. Most places of lodging utilize a front desk manned by an employee and at which registration information is obtained, a mode of payment is arranged and room keys are dispensed and collected. All these somewhat routine but personal tasks require most hotels and motels to staff their front desks 24 hours a day.

For some large hotel and motel chains, sufficient personnel time is available to staff the front desk at all times, to process arriving and departing guests, and to give out and collect room keys. However, small hotels and motels, including even the smaller or regional chains, and particularly individual or family owned units, often do not have the personnel or the resources to staff a front desk at all times. In many situations, the only staff at the smaller establishments is the proprietor or the immediate family of the proprietor, because limited operating budgets may be more wisely spent in activities other than staffing a front desk during inactive shifts. This smaller personnel base often means that guests arriving at off hours must ring a bell or buzzer for assistance, waking the manager or proprietor. Even large hotels, although able to staff the front desk at all times, may also have better ways of using operating dollars as opposed to constant staffing of the desk.

A major reason for needing a manned front desk has been the need to dispense and collect room keys. In recent years, the room key has evolved from the easily misplaced or duplicated metal key, to plastic hole-encoded punch cards, and then to plastic magnetically encoded room key cards proprietary to the hotel or motel and dispensed from the front desk. The latter key cards are useable only at the place of lodging and operate by the use of a magnetic card reader at the door of a guest room to actuate the guest room door lock after the card has been recognized and approved.

Hotel room key security is an ongoing problem when conventional keys and key cards are used. While a guest has some concerns about loss of his room key, it is seldom given the same level of concern as would be assigned to the guest's personal keys, wallet or the like. The guest's level of concern also varies with his perceived risk as, for example, a guest being fairly unconcerned with key security before he has physically placed his property in the guest room or after he has removed the property. Guests may even voluntarily allow others to use their hotel key, resulting in a still lower standard of security. The guest seldom realizes that each time the key is lost or available to unauthorized persons, that room security is jeopardized in some way, such as the room's equipment being vulnerable to damage, theft or other intrusion. Because of these attitudes hotel guest room key problems are substantially greater and more numerous than those encountered for a private residence. The present invention provides a workable solution to these difficulties.

With these shortcomings in mind there remains a need for a guest registration system which can successfully receive and also discharge the guest and address the problem of delivery and collection of a room key when employees are not available to assist the guest.

Similar room entry problems exist in many buildings and facilities other than hotels and motels. For example, office buildings, hospitals, many government and commercial buildings, schools and colleges, as well as certain apartment complexes have large numbers of doors which must frequently be retained in a locked condition while still requiring that the rooms be accessible to authorized persons. To allow central control of each of the many doors in such structures can be an expensive undertaking if control wiring must be extended from a central control point to each room and its entry door. It is desirable to provide an apparatus by which specific entry cards can be utilized as a key at each of these many doors and that each of the doors be capable of being programmed and reprogrammed to recognize specific cards. Even in situations where doors use conventional keys and are not provided with entry cards and entry card readers, the ability to quickly lock and unlock doors in a large facility can be highly desirable in order to permit rapid access of fire fighting crews and other emergency personnel when needed. Using conventional lock systems, which cannot be controlled by a central control system, emergency personnel when called to fight a fire at such a facility may be compelled to destroy locked doors in order to gain entry, and the amount of fire damage which can occur before doors can be effectively forced opened can be extensive. It is an object of the invention to provide a door control apparatus which will allow multiple doors in a facility to be unlocked by wireless, remote command in order to quickly deal with an emergency situation and allow access of fire and emergency personnel to all controlled rooms when necessary. Installation of such a system has been economically prohibitive when control wiring must be installed between the central control system and each room. In such situations, the cost of cutting through walls, removing wallpaper, upsetting carpet arrangements and the like is so aesthetically intrusive as to discourage the installation of a central lock control system.

Another shortcoming of most door control systems is that little or no information is available to the central control system as to the conditions at each room door, i.e. whether the lock is in locked or unlocked condition, whether the door is fully closed in the door jamb, or any information as to the card holders who have accessed the door and the times of access. It is desirable to have a door control system in which such information can be periodically transmitted to the control system for effective monitoring of the door for security and maintenance purposes.

Still another shortcoming of present lock control systems is that it is difficult and expensive to add additional doors or rooms to an existing door control system once a system is installed because most such systems operate with wiring which must be connected to each door and which requires extensive installation procedures. It is desirable to provide a system by which additional rooms and doors may be quickly added to the door control system without destroying or interfering with the aesthetics of the building.

The invention provides a solution to these shortcomings.

SUMMARY OF THE INVENTION

The present invention includes a guest registration system well suited for both small hotels including those operated by one or two people and for large hotel and motel chains and substantially eliminates the need for continuous front desk registration work. The invention allows the manager or proprietor of a hotel to be away from the front desk to perform other activities, such as cleaning, laundry, maintenance, personal activities, or sleep. At the same time, the invention affords the manager or proprietor the knowledge that guests arriving during his absence will still be able to register at the place of lodging, receive a room and key, and check in quickly and efficiently.

The invention utilizes a registration terminal placed in an area accessible to a potential guest. The terminal utilizes a general purpose credit card reader, display screen, keypad and printer for preparing a summary of the room assignment and a receipt for the guest. The prospective guest inserts a general purpose credit card through the card reader. The card reader obtains card identity information from the card, and delivers the information to a computer provided with guest registration software for directing the computer. Using the software, the information from the card is verified by its issuing credit card service company, in known fashion, to determine the validity and spending limits of the credit card.

The computer maintains information about the status of vacancies and types of rooms available at the place of lodging. The computer software sends a series of prompts to the user via the display screen, asking for additional guest data. This data may include such information as whether the user has preregistered, what type of room is desired such as a single room or a double room, the expected length of the stay, the smoking preference and possible use of a personal identification number. Once the preferences have been entered, the guest registration system will assign the guest an available room, inform the guest of the charges based on the type of room selected and the expected length of the stay, store the credit card identity information, inform the guest that the credit card is a key for the assigned room and print and dispense a written receipt and instruction describing the room assignment.

A guest room credit card reader is positioned at each guest room door. When the guest runs the proper credit card through his guest room card reader, a door lock release apparatus at the guest room door will open the lock, allowing the guest into the room. Further, the guest's credit card can be authorized to open the locks on various other areas of the place of lodging.

In some instances, particularly when installation will be made in an already built and operating hotel, it is desirable to avoid or minimize the installation of control wiring within a finished and decorated guest room or cutting into walls, doors, or carpets to place wires. The invention may be installed in such environments by using wireless communication means to transfer information between the computer and the guest room card reader so as to actuate the door lock release apparatuses of the present invention. Such wireless communication means reduces installation time and costs as well as minimizing the amount of required remodeling in an existing place of lodging.

Accordingly, the present invention can include a guest room wireless transmitter positioned in or adjacent a guest room, and additionally a guest room door wireless receiver positioned at or near the guest room card reader and connected by electrical wiring to the card reader. The guest room transmitter may be connected to the computer utilizing any part of the existing electrical wiring system serving the room, including television cable, intercom, telephone wiring, or standard electric service lines. Wireless communication between this transmitter and receiver results in credit card identity information being delivered by wireless signal to the guest room card reader and will thus allow the card reader to be programmed by wireless transmission to recognize a specific credit card as a guest room door key. In some situations the guest room transmitter may be replaced by a master transmitter which serves the entire hotel, with its signals being transmittable to all the guest rooms to reach each individual guest room receiver so as to program the guest room card reader connected with that receiver to accept a specific credit card.

It is also contemplated that the described receiver at the guest room card reader will at times be a transceiver positioned at the guest room door and capable of both receiving and transmitting wireless information signals. Some guest room card readers will only read the guest card identity information as the card is inserted and will not retain the information in memory. With such readers, a door transceiver may be utilized to receive the card identity information by wire from the guest room card reader and to then transmit the card identity information to a guest room transceiver positioned in or near the guest room or to a master transceiver serving the entire hotel. The room or master transceiver, on receiving the card identity information will relay that information by hard wired connections to the hotel computer, informing the computer of the card seeking access to the specific guest room. If the computer recognizes and accepts that guest card as an approved key the computer generates a signal which is sent via hard wired circuit to the room transceiver or master transmitter. The room transceiver or master transmitter responds by transmitting a wireless signal to the door transceiver. The door transceiver on receipt of this signal conveys the signal over wires to the guest room card reader, causing the lock to open to an approved card.

Use of such wireless communication means eliminates the need to place new wiring into the guest room walls and doors of an existing building. Further, the actual guest room receiver which receives a wireless control signal may be located inside the guest room near the guest room door or even within the guest room card reader located at or on the guest room door, lowering the possibility of system corruption from points external to guest rooms. Acceptable wireless communication means include infrared emitters and receivers, sound wave transmitters and receivers, radio frequency transmitters and receivers, and commercially available pager systems.

Pager systems are particularly well adapted for the transmission of the numerical data associated with entry cards, card identification data, and room data. Commercially available pagers are extremely reliable for receiving such numerical data, are compact in size, and when powered by batteries, can receive instructions even should fire destroy portions of the structure between a given room and a central lock control center.

The door control apparatus utilizes a control system which may be located at a central control center, and the system includes a computer programmed to include the identity of all doors and rooms requiring control in a given facility. The program will also include an identification of all individuals authorized to have entry to all or specific rooms of the facility and can associate a specific entry card with each room and each authorized person. The computer will be operatively associated with a main paging transmitter to allow the main paging transmitter to broadcast instructions directed to particular door locks to program each of the door locks to allow a predetermined entry card or cards to open those locks.

Each door in the facility may be provided with a door control unit which will include an entry card reader, a controller, and a local paging unit. The local paging unit will include at least a paging receiver to wirelessly receive the signals from the main paging transmitter. The controller will typically also include a memory to allow retention of instructions and commands received from the main paging transmitter. The controller will compare the card identity information associated with each entry card inserted into the card reader with the list of authorized cards received from the main paging transmitter, and when an authorized card is recognized, the controller will actuate a door lock release apparatus to open the lock on the door. While the apparatus is most effective when used with a card reader and entry cards, it should be understood that the invention may also be used in facilities where no entry cards are utilized. Even with doors equipped with traditional key locks, the invention would allow any locked door in the facility to be immediately opened in cases of emergency and to allow access to fire fighters or other emergency personnel when needed.

If desired, the door lock control apparatus may utilize two-way paging systems which would allow the door control unit at the door to broadcast door information to a main paging receiver connected with the control system. Door information could include inter alia whether the lock was in a locked or unlocked condition, whether the door was fully closed in its door jamb, specific identification of the entry cards authorized to open the lock and at times a history of the entry cards which were read by the card reader during a predetermined past time interval with times of card use.

These and other benefits of the present invention will become apparent from the following detailed description thereof taken in conjunction with the accompanying drawings.

DETAILED DESCRIPTION

Figure 1:
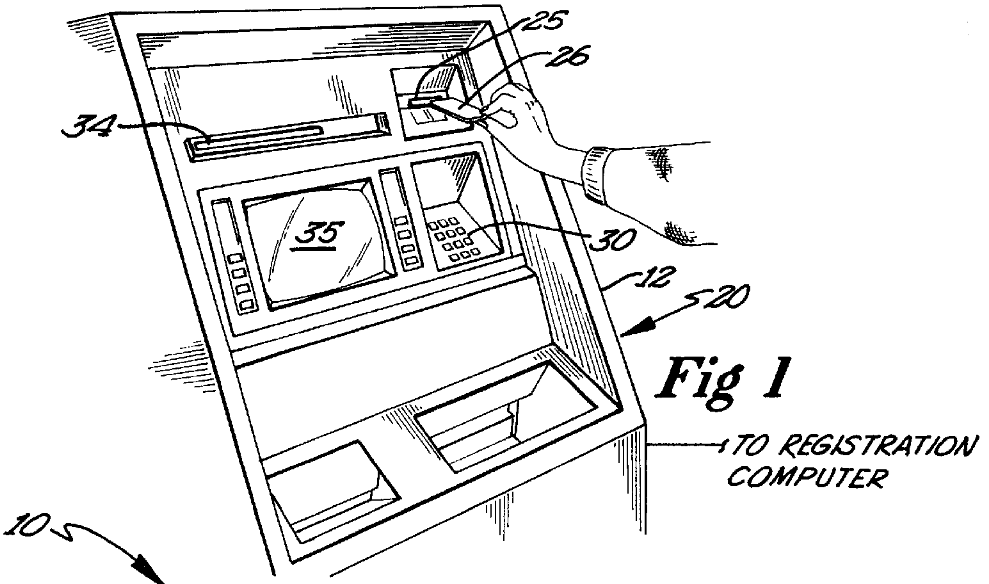
FIG. 1 is a perspective view of a typical registration terminal embodying the invention.

Referring now to the drawings, the guest registration system 10 includes a registration terminal 20 having a terminal credit card reader 25, a data input means such as alpha-numeric keypad 30, and a data conveying means for delivering information to a guest, such as display screen 35 and printer 34 which provides receipts and room instructions. Although the keypad 30 and display screen 35 are the preferred data input and conveying means to be used in the registration terminal 20, any devices or systems currently in use, or to be developed in the future, by which communication can be effectively completed are within the purview of the invention. Such alternatives include, but are not limited to, voice operated components and touch screens. The terminal credit card reader 25 is shown as a standard magnetic card reader, although a programmable or non-magnetic card reader could be substituted and is within the purview of the invention.

The registration terminal 20 includes a housing 12 designed to allow the registration terminal 20 to be a stand alone unit that may be placed in a convenient location, such as in a drive up registration booth so as to allow a potential guest to receive registration data without leaving his or her vehicle. Alternatively, the registration terminal 20 could be placed in a walk up booth, or a terminal in the lobby of the place of lodging. For the purposes of this invention, a place of lodging should be understood to include, but not be limited to, a hotel, motel, boarding house, lodging house, bed-and-breakfast, or the like. Accordingly, when these terms are used herein, it should be understood that the terms are interchangeable.

Figure 2:
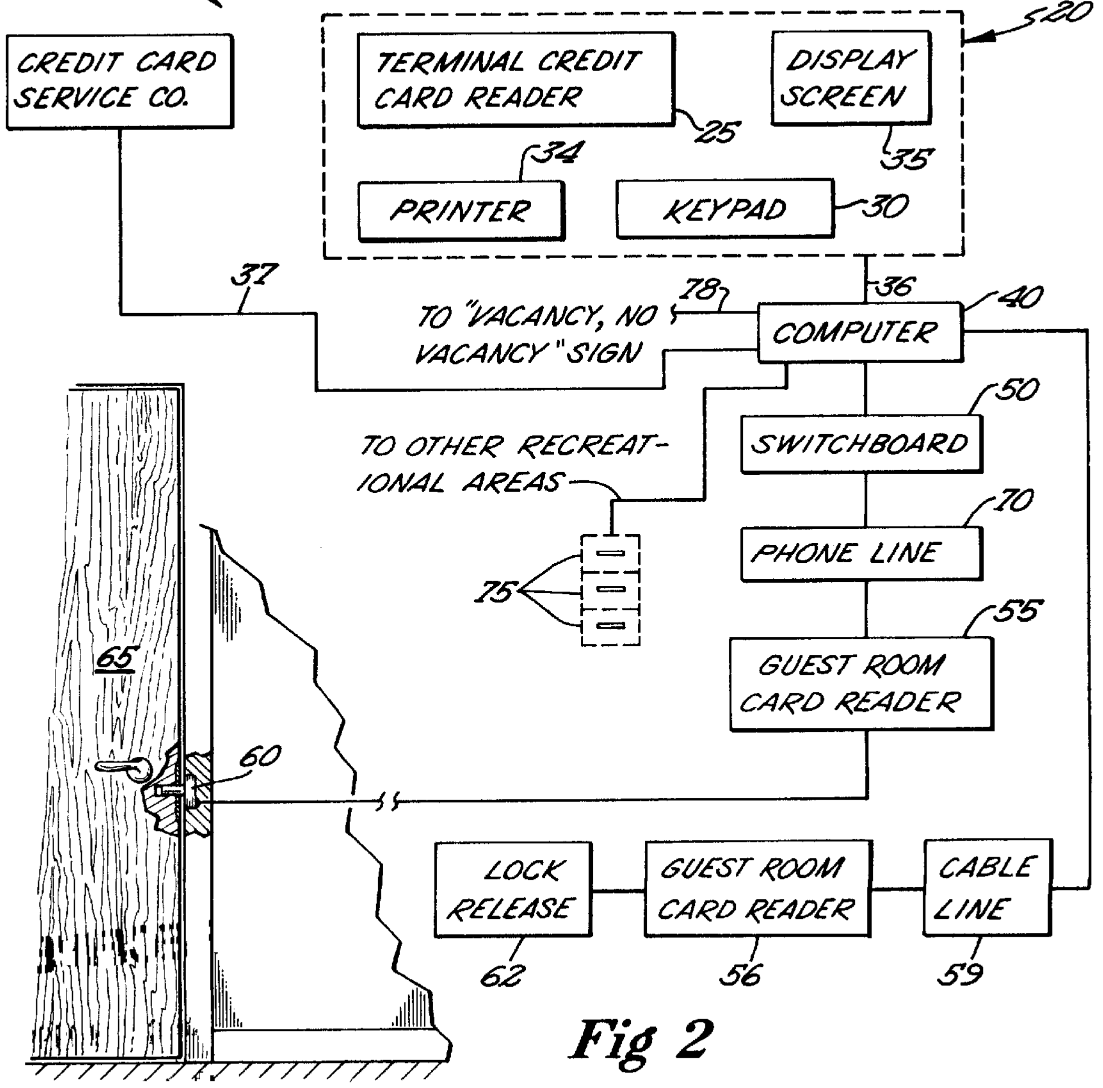
FIG. 2 is a block diagram of a guest registration system embodying the invention.

As is represented in the block diagram of FIG. 2, the terminal credit card reader 25, keypad 30, and display screen 35 and printer 34 are all operatively connected by connection cable 36 to a computer 40. The connection is preferably electrical, but other forms known or hereafter developed of information transmitting means are acceptable. The computer 40 may be an existing computer or a computer system already located at the place of lodging, or it may be provided as part of the guest registration apparatus 10. The registration computer 40 is connectable by modem with telephone switchboard 50 in known fashion to allow communication with a credit card service company for verifying credit information for the general purpose credit card 26 carried by the potential guest. For purposes of this invention, the term, general purpose credit card, should be interpreted to be any credit card issued by a bank, other financial institution, or general credit card service company, as opposed to a specialized card issued by a specific place of lodging, and includes but is not limited to cards issued under trademarks such as Master Card, Visa, Discover, or American Express. The computer 40 is provided with guest registration software suitable for controlling the information storage, retrieval, and informational operations of the guest registration system 10.

The registration system 10 also utilizes a plurality of guest room credit card readers, here illustrated as readers 55 and 56 and a plurality of door lock release apparatuses 60 and 62, connected through readers 55 and 56, respectively, to the computer 40. A room card reader such as reader 55 is positioned adjacent each guest room door. The card reader 55 may be connected to the computer 40 by utilizing existing telephone wiring 70 already in place between the computer 40 and individual guest rooms. Typically a modern phone wire contains at least 4 and sometimes more individual wire strands, some of which are not used unless main telephone wire leads break or fail. Certain of these unused extra wires may be used to convey electrical signals between the computer 40 and card readers such as unit 55. Similarly there may be circumstances where the signals from computer 40 may be delivered to a guest room card reader 56 through cable television lines 59, coding them in ways which will not interfere with conventional cable signals. Use of the telephone wire 70 or cable lines 59 will in some instances avoid the need for new wiring between the computer 40 and guest room card readers 55 and 56 and thereby reduce installation cost. The line 59 identified as a cable line, should, however, be understood to represent either cable television lines or conventional computer cable connections. Similarly standard wiring used to carry 110 or 220 volt power throughout the place of lodging may also serve as a medium on which signals may be conveyed using appropriate coding. Any such electrical wiring system, including telephone wires, cable television lines, house current wiring, intercoms and the like may be utilized with the invention as a conduit for the relaying of signals thereon between computer and guest room. Although only two card readers have been shown herein as illustrative of the invention, it should be understood that a larger number would be used in a typical hotel installation, connected in like fashion, and is within the purview of the invention.

The computer 40 will actuate the room door lock release apparatus 60 of the associated guest room when the computer recognizes that the proper credit card 26 has been inserted into the room card reader 55. The door lock release apparatus 60 is preferably a solenoid equipped strike plate replacing the strike plate of the original lock, but any other transducer capable of unlocking the door in response to insertion of the guest credit card is useable and within the purview of the invention. Upon check-out from the place of lodging, the computer 40 simply removes the credit card identity information from memory and the card 26 ceases to function as a guest room key. There is no need for registration information to be overwritten on the magnetic strip of the credit card 26, since none has been written on the credit card 26 in the first place.

It should be understood that guest credit cards 26 could also be magnetically encoded with various pertinent guest information by the use of a special encoder located at the front desk of the place of lodging, but this is not the preferred practice. Ample memory exists on the magnetic strip of most credit cards to allow them to be encoded with information which would in itself be the code to actuate a card reader. Encoding such information directly onto the magnetic strip of the credit card 26 has certain shortcomings, however, and is not desirable. If the card 26 is lost, stolen, or replaced, the entity issuing the card can not record the place of lodging information onto a new card. Additionally, if room entry information encoded on the card 26 is not deleted in a timely manner, the card 26 will remain valid as a hotel key beyond the term of the room rental and becomes a potential security risk to the hotel and its future guests. Although information encoded onto the card 26 could be overwritten at the time of the next hotel registration, such overwriting or deletion may never occur when a guest is not a frequent customer, or the next hotel is not part of the same chain. In practice it seems likely that the information encoded onto the card 26 will not be overwritten unless and until the same credit card is used to register at another hotel, and only if that hotel uses an encoding system like the one used at the previous hotel, and only if the information is encoded in the same space of the magnetic strip of the card as in the previous hotel. Accordingly a magnetically encoded card still requires handling by staff at both the time of registration and departure, and such a card does not appreciably reduce the processing work required of the staff.

The hotel's switchboard 50 may also be connected with the registration terminal 20, or with the hotel computer 40 to allow a guest to pre-register at the place of lodging by telephone and to allow the computer 40 to bill long distance guest telephone calls to the credit card 26.

The computer 40 may also allow the guest credit card 26 to trigger actuation of door lock release apparatuses at entrances to other parts of the place of lodging, such as recreational areas, the pool, the exercise room, or the laundry room. This would allow access to those areas when the credit card 26 is inserted into one of several card readers 75, located adjacent the entrances to the place of lodging's recreational areas, in the fashion described above.

Figure 3:
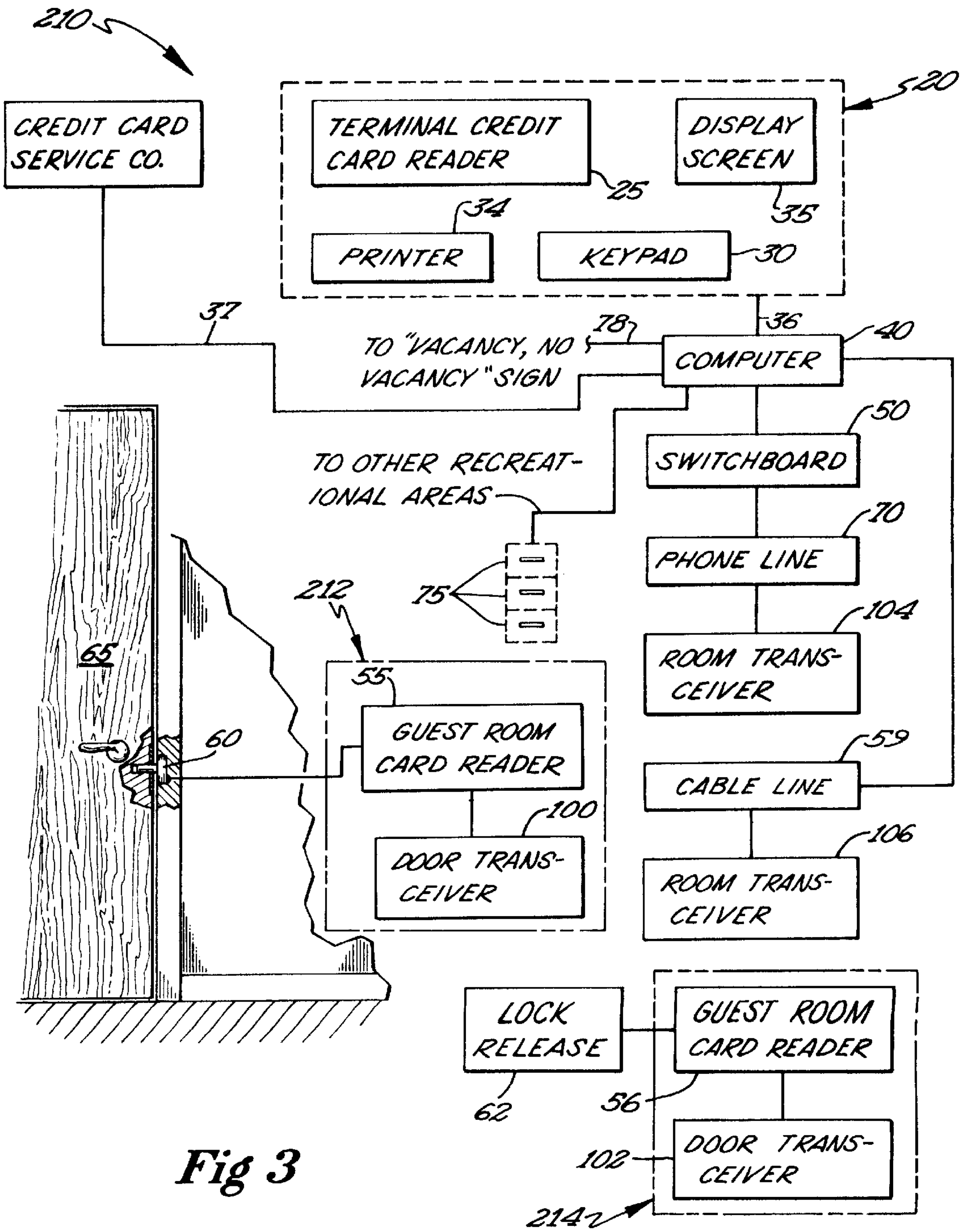
FIG. 3 is a block diagram of a wireless transmission embodiment of the guest registration system having transmitters and receivers within a guest room.

Referring now to FIG. 3, a wireless transmission embodiment 210 of the guest registration system may be seen. Such an embodiment eliminates the need to rewire or invade many difficult-to-access areas of the place of lodging, such as the existing walls, floors and ceilings of the guest rooms.

Referring now to FIG. 3, a first wireless communication means, here shown as guest room transceiver 104 or 106 is electrically connected by phone line 70 or cable line 59, respectively, or by other in-place electrical wiring to computer 40. The electrical wiring utilized may be any in-place system such as telephone lines, television antenna or cable lines, intercom or A. C. wires. Since room transceivers 104 and 106 are identical, only transceiver 104 will be described in detail below. The transceivers are of a power level to adequately transmit short distances to reach the guest room door receivers 100 and 102 described below.

A second wireless communication means, here shown as door transceiver 100 or 102 is electrically connected to an associated guest room card reader 55 or 56, respectively. The reader 55 or 56 is positioned on or adjacent the guest room door and accessible to a guest outside the door. Room transceiver 104 communicates wirelessly with door transceiver 100. Similarly room transceiver 106 communicates wirelessly with door transceiver 102. Door transceivers 100 and 102 are identical in nature, and accordingly only door transceiver 100 will be described in detail. It should be understood, however, that in most installations there will be a separate room transceiver and associated door transceiver allocated to each guest room.

The door receiver 100 and its associated guest room card reader 55 constitute a door control unit 212 which is electrically connected to a lock release apparatus 60. Similarly guest room card reader 56 and its associated door transceiver 102 collectively constitute a second door control unit 214 which is electrically connected to lock release apparatus 62. Since the door control units 212 and 214 are identical only the unit 212 will be described further hereafter.

In some cases the door transceiver 100 positioned at the guest room door need only be a wireless receiver and the room transceiver 104 need only be a transmitter. In such a case, credit card identity information would be delivered to the transmitter 104 from the computer 40 along telephone line 70. This information would then be transmitted by transmitter 104 and received by wireless receiver 100. The receiver 100 then delivers its received card identity information over electrical wires to its associated guest room card reader 55. The card reader 55 can include a memory element in which the card identity information is stored and against which the card reader 55 would compare each card it reads. When a card is read which matches the stored credit card identity information, the reader 55 would actuate the lock release 60 to allow the matching card to be accepted as a room key.

While the memory element may be located in the card reader 55, it should be understood that such memory can also be a separate element of the door control unit 212 on a part of the door transceiver 100, and all such variations are within the purview of the invention. The door control unit 212 will actuate the lock release 60 when a credit card read by card reader 55 matches the card identity information supplied to the door control unit 212 from the computer 40.

Under some circumstances, the door transceiver 100 and the room transceiver 104 may both be transceivers capable of both transmitting and receiving wireless signals. This arrangement is important when the components of door control unit 212 have no memory element. In such an arrangement, when a guest inserts his credit card within the guest room card reader 55 in order to open the door and gain access to his room, the card reader 55 first reads the offered card and obtains the card identity information therefrom. This card identity information is then delivered over electrical wiring to the door transceiver 100, and the transceiver 100 transmits the card identity information wirelessly to the room transceiver 104. The transceiver 104, on receiving the transmitted card identity information will deliver that information to the computer 40 along phone line 70. The computer 40, after receiving the card identity information, will compare that information with its memory to determine whether the card belongs to an approved guest.

When the computer confirms that the card is an approved card, the computer 40 sends a signal along the telephone line 70 back to room transceiver 104. The room transceiver 104 wirelessly transmits this signal to the door transceiver 100 of door control unit 212. When the door unit 212 receives the signal, that signal will be used by either reader 55 or receiver 100 to actuate the lock release apparatus 60 to unlock the guest room door. If the credit card identity information matches no card in computer memory, the guest room door remains locked.

With the described wireless communication means, the room transceiver (or transmitter) 104 is preferably positioned within the guest room at a convenient location and is hard wired directly to the computer 40 over the described electrical wiring serving the guest room. This location may be chosen for the convenience of the installer, and may be concealed within the room or it may be adjacent the connection point for the wiring used to carry signals from the room transceiver 104 to the computer 40. The placement of the connection point within the room also makes it less accessible to those outside the room seeking unlawful entry to the room.

The door transceiver (or receiver) 100 is preferably positioned immediately adjacent the guest room card reader 55 within the guest room or can even be included as a subassembly within the card reader housing, both alternatives being within the purview of the invention. Since it is necessary to have a hard wired connection between the transceiver 100 and the card reader 55, it is desirable to place the two in as close proximity as physically possible in the guest room.

By utilizing the wireless communication units 100 and 104, the need to run wires all the way from computer 40 to the guest room card reader 55 is eliminated. In particular, the need to disrupt an attractively finished guest room by tearing up carpeting, removing molding or cutting or drilling associated with new wiring is reduced or eliminated.

While the embodiment 210 has been described as utilizing a transceiver (or transmitter) 104 in each guest room, it should be understood that in some hotel installations it may be desirable to instead have only a single master transceiver (or transmitter) centrally located in the hotel, and to use such master transceiver to broadcast at multiple distinct frequencies associated with each room transceiver (or receiver) 100. Alternatively, a single frequency might be utilized and coded to associate with and control the transceivers 100 in individual guest rooms.

Although the wireless communication means 100 and 104 described herein preferably utilize wireless radio frequency signals, it should be understood that other wireless means such as infrared light and sound waves are within the purview of the invention and where suitable may be utilized. The term "radio frequency" is intended to cover any wireless radio frequency useable for communication purposes and is not limited to frequencies associated with commercial radio transmissions.

Figures 4, 5:
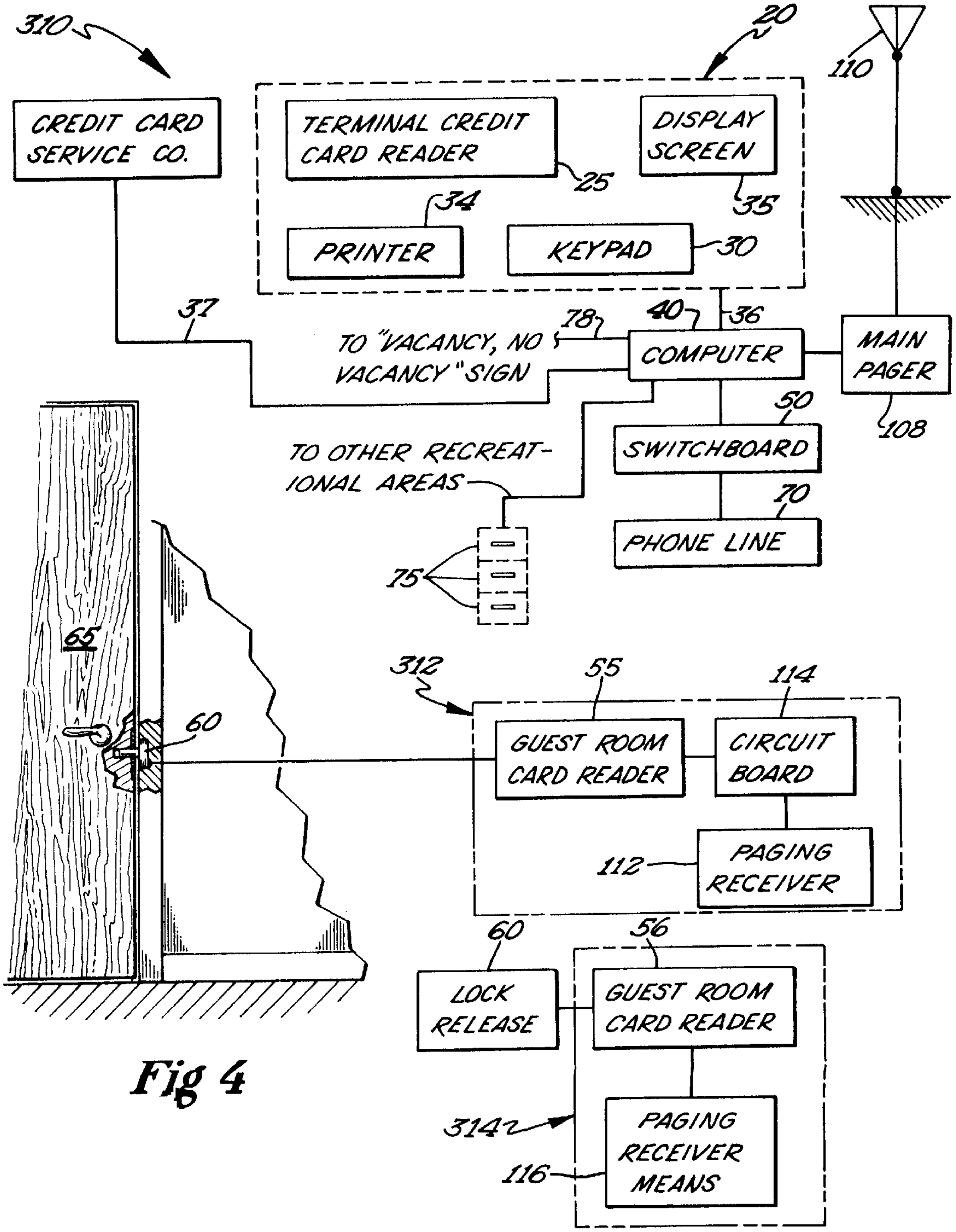
FIG. 4 is a block diagram of a wireless transmission embodiment of the guest registration system having direct wireless communication between a hotel central computer and the guest room card reader.
FIG. 5 is a block diagram of an alternative door control unit which may be used with the embodiment of FIG. 4.

Referring now to FIG. 4, a further embodiment 310 of the hotel registration apparatus is shown. In FIG. 4, the components which are common with the earlier described embodiments are labeled and numbered with the same numbers used for the earlier embodiments. New components and connections are described hereafter. The embodiment 310 utilizes commercially available pager technology in providing the wireless communication between computer 40 and guest room card reader 55.

A main paging transmitter 108 is electrically connected to the computer 40 and defines a first wireless communication means to allow card identity information to be sent to a second wireless communication means here shown as paging receiver 112. As used herein, the term main paging transmitter includes a transmitter unit large enough to transmit from the unit's location to any guest room of the place of lodging and utilizes pager technology of the type which transmits phone numbers and messages to portable pagers of the type now in wide commercial use. However, instead of transmitting and receiving phone numbers, the unit would transmit credit card identity information to paging receivers, with one such receiver positioned in each guest room. A transmitter antenna 110 connected to the main paging transmitter 108, is preferably mounted on top of the hotel structure to be serviced by the wireless paging system, to increase the range and effectiveness of the transmitter. The paging transmitter may be located on hotel premises or may be a remotely located transmitter positioned elsewhere and accessed by the hotel computer over wires, cables, or telephone lines.

A standard, commercially available paging receiver 112 defines a paging receiver means and is placed adjacent the guest room door, as for example, on the wall beside such door, or within the strike plate or even on or in the door of the guest room, and delivers information to the room card reader 55. Electrically connected with the paging receiver 112 is a circuit board 114 which constitutes a paging memory means capable of interpreting and storing in memory information signals containing credit card identity information received by the paging receiver 112, so that when a guest inserts credit card 26 into the guest room card reader 55, the circuit board 114 compares the credit card identity information with that of the credit card and determines whether the lock release 60 should be actuated. The room card reader 55, paging receiver 112 and circuit board 114 collectively constitute a door control unit 312.

The main paging transmitter 108 receives card identity information from the computer 40. The computer 40 has gathered this information from the guest and the guest credit card 26 at check-in, as described above. Once the computer 40 has assigned the guest a room it sends the proper information, such as credit card number and room number, to the main pager transmitter 108, which in turn pages the paging receiver 112 of the proper room with the information. The circuit board 114, located in the guest room door control unit 312 stores the received information, and when the guest runs his proper credit card 26 through the guest room card reader 55 the door lock release apparatus 60 is actuated, and the room door opens. Circuit board 114 will typically include circuitry to receive and store in memory the credit card identity information of the card authorized to open a specific guest room. In addition the circuitry will be connected with the room card reader 55 to receive card identity information relating to each card read by reader 55. The circuit board 114 will then compare the offered card's information with the authorized card information, and if a match occurs will signal the card reader 55 or lock release apparatus 60 to open the guest room door.

Referring now to FIG. 5, an alternative door control unit 314 is shown and includes card reader 56 and a paging receiver means 116. The door control unit 314 may be used in place of the unit 312 shown in FIG. 4. Paging receiver means 116 comprises an integral paging receiver and associated circuitry which is capable of receiving a card identity information signal transmitted from paging transmitter 108, interpreting and storing the information received, and communicating with the guest room card reader 56 when the guest runs a proper credit card 26 through card reader 56. The circuitry of paging receiving means 116 will allow quick and easy comparison of information received from the main pager 108 and the credit card 26 of the guest. If the proper credit card 26 has been run through the proper guest room card reader 56, the comparison will be positive, and the associated circuitry will send appropriate instructions to actuate the lock release apparatus 60 at the guest room.

Since the communications from the main paging transmitter 108 are wireless, there will be no need to add to existing wiring within the guest room. The power source for the paging receivers located at the guest room door will preferably be batteries. Alternatively, the paging receivers at the guest room doors may be connected through appropriate transformers and rectifiers to standard electric service lines serving the place of lodging.

In operation, a guest arriving at the registration terminal 20 inserts his general purpose credit card 26 into the terminal credit card reader 25. The terminal credit card reader 25 reads the card identity information encoded on the credit card 26, and conveys that information and other guest information obtained by the terminal to the computer 40, and hence to the guest registration software. The term, guest data should be interpreted to include inter alia, the guest name, address, credit card service company, account number, and the like and also preferences of the guest including such things as room size, bed size, number of guests, smoking preference and term of stay. Once the credit status of the card 26 has been verified in known fashion, the computer 40 prompts the display screen 35 to execute a series of prompts to the guest. These prompts may include such things as asking for a personal identification number to be used for extra security, room occupancy need (such as single or double and number of guests), smoking preference, and expected length of stay. The guest uses keypad 30 to provide answers to the prompts. Any number of other prompts may be programmed into the software. For example, the guest may also be prompted by a display on the display screen 35 to enter on the keypad 30 a time to be awakened. The computer 40 stores all such guest data and card information obtained as a result of these prompts at least until the guest checks out.

The computer 40 next calculates the expected charges for the stay, assigns a guest room to the guest based on the answers to the prompts, and uses the display screen 35 to display the room assignment and location and expected charges, as well as having the display screen 35 inform the guest that the guest credit card 26 will serve as the key to the assigned room. In addition, the printer 34 may be actuated to provide both a receipt and written instructions describing the assigned room, its location and the fact of the guest credit card being the room key. Once a guest has registered using the credit card 26, the computer 40 stores the credit card identity information. When a credit card 26 is inserted into a room magnetic card reader 55, the room magnetic card reader 55 transmits to computer 40 in various described ways the credit card identity information. The computer 40 determines whether the proper credit card 26 has been inserted into the proper guest room card reader 55. If so, the computer 40 causes the door lock release apparatus 60 at the assigned guest room to be actuated. If an improper card is inserted into the room card reader 55, computer 40 will not actuate door lock release apparatus 60. In an alternative embodiment, the guest room card reader 55 could retain in memory the credit card information transmitted to it by computer 40 and be programmable to actuate the door lock release apparatus 60 on recognition of the card 26 without the need for further communication with the computer 40. All of these steps are accomplished without interfacing with hotel employees.

The guest's personal credit card 26 thus becomes his room key and it also may become a key to other areas of the place of lodging. It may also be used to charge long distance telephone calls, to order room service, or to obtain service at the hotel restaurant. Upon check-out, the registration computer 40 simply de-activates the guest information, eliminating the problem of illicit duplication of metal keys or punch-coded cards. Alternatively, only the credit card key usage authorization could be de-activated, leaving the other guest information to be stored for future stays by the same guest. In this way, hotel security is increased. Security is also increased by having the guest's credit card 26 be the room key since the guest is much more likely to closely guard his or her credit card 26, which has personal value, as opposed to a hotel key, with little personal value.

The guest registration system 10 eliminates the need for hotel staff to continuously man the front desk and automatically generates billing information through the use of the computer 40, allowing the guest to check out of the hotel using the system 10. Since the guest registration system 10 has all of the credit card identity information, the disclosed invention constitutes a complete system of guest registration. When the guest wishes to check out, it is a simple matter to go to the registration terminal 20, run the credit card 26 through the terminal credit card reader 25, and indicate by use of the keypad 30 the desire to check out. The computer 40 calculates a bill based on the number of nights stayed and the room occupancy, long distance calls, and other charges accrued to the credit card 26, and can bill the credit card 26 directly for those services and print and dispense an appropriate final receipt or statement. Alternatively, the registration terminal 20 can print a bill to be paid at the front desk of the hotel during regular staff hours. In the event the guest does not check out, the system deactivates his key card authorization at the end of his indicated tenancy and bills his charges to the credit card account.

With minor adaptations well within the ability of those skilled in the art, the guest registration system 10 can be customized to the place of lodging at which it will be used. Further additions to the services provided by the guest registration system 10 might include operating a "Vacancy/No Vacancy" sign 78 at the place of lodging depending upon whether a room is available, and other additions that those skilled in the art would readily discern.

Figure 6:
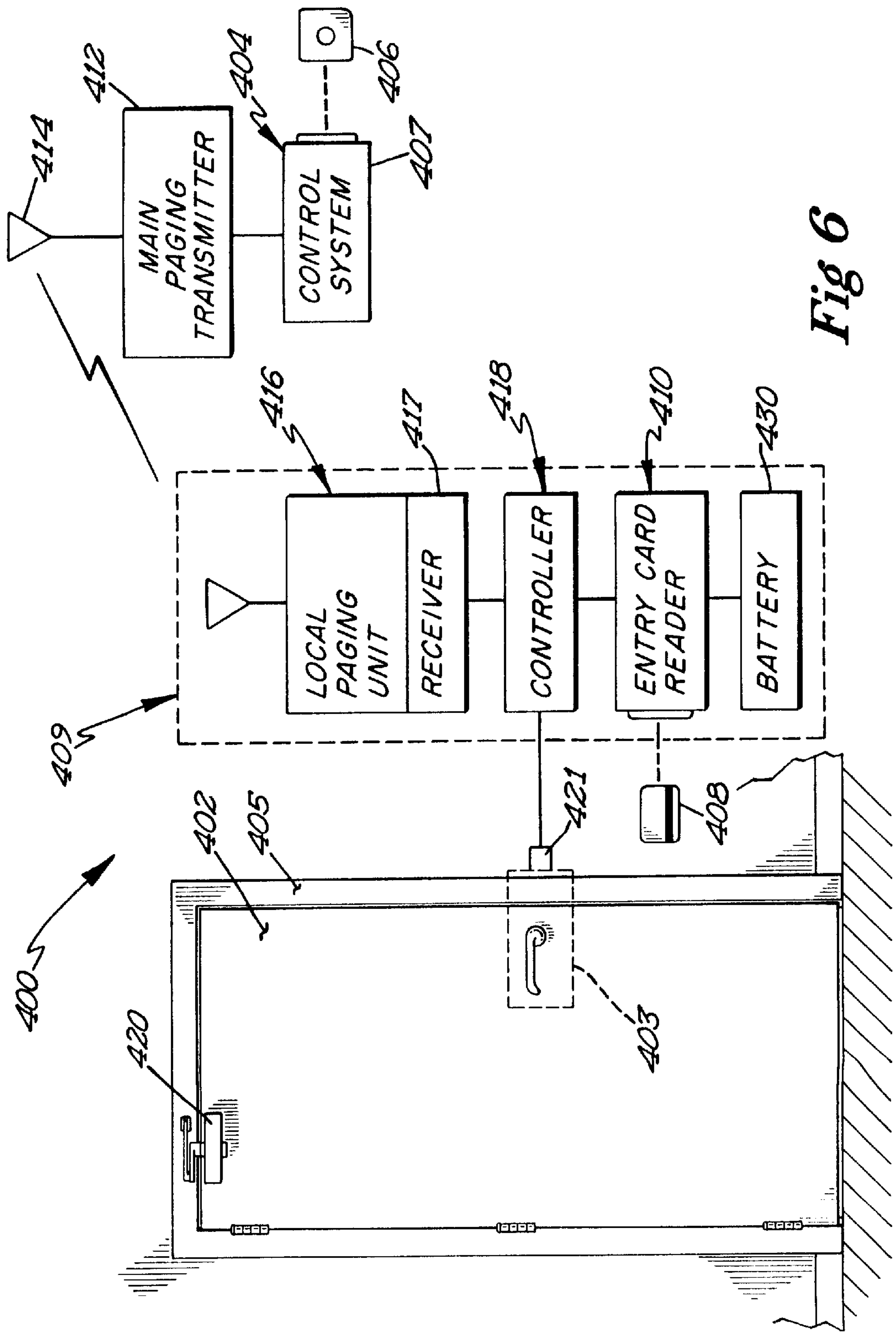
FIG. 6 is a block diagram illustrating a door lock control apparatus embodying the invention and associated with a door whose lock is to be controlled.

A further embodiment 400 of the invention is shown in FIG. 6 and comprises a door lock control apparatus which utilizes paging technology to transmit instructions and data from a control system to one or more doors such as door 402 in a facility in which the apparatus is installed.

The embodiment 400 utilizes a control system 404 which will include a computer, 407 and which may be located at any suitable location in or around the facility. The computer 407 of control system 404 will be provided with appropriate software 406 which allows identification and selection of the doors and/or rooms in a facility which need locking control or control of access of employees or visitors to such rooms. Such software 406 will also include identification of all employees and visitors authorized to enter the various rooms and doors of the facility and the specific identity of such rooms or doors which each person or group of persons is authorized to enter. Each person may be provided with an entry card 408 which will be readable by an entry card reader 410 and which is positioned on or closely adjacent each door 402 which is to be controlled. Each such card 408 will contain card identity information, and that information will also be entered in the software program 406 with sufficient particularity to identify the card and distinguish it from other entry cards. The card identity information may also include other data.

The control system 404 is operatively connected directly or by modem to a main paging transmitter 412 which has an antenna 414, allowing the control system 404 to dispatch an information signal to the transmitter 412 and the transmitter to wirelessly transmit the information signal to one or more doors such as door 402 of the facility.

The main paging transmitter 412 utilizes radio transmission technology associated with commercially available paging transmitters of the type which transmit phone numbers or other messages to individual pager receivers of the type or similar to the type carried by many businessmen and others. Instead, however, of transmitting telephone number data to a paging receiver the main paging transmitter 412 will transmit entry card identity information and other information to local paging units 416 which will include a local paging receiver 417, such a separate local paging receiver 417 being associated with each individual room or door 402 in the facility. The information may include a command to lock or unlock the door, the card identify information of a specific entry card or cards which are authorized to unlock the door 402, a command to remove one or more cards from the list of those authorized earlier to open the door, or other useful data. The term, local paging unit or local paging receiver, as used herein is used only as a convenient term to designate a paging receiver which is positioned at a specific local door location. The term, local, should not be construed to suggest any range limitation or other limit on the receiver's ability to capture radio signals.

A door control unit 409 is mounted adjacent each door 402 which is to be controlled and may be mounted on the door or near the door. The door control unit is preferably an integral unit which may be easily and economically mounted at each door site and may include several components, such as an entry card reader 410, a local paging unit 416, and a controller 418. Each of these components will be described further herein. The door control unit 409 may be attached to the door or adjacent wall in any known manner but should be mounted to make it difficult or impossible for an intruder to easily obtain access to the internal components and tamper with or damage the components.

The entry card reader 410 used with controller 409 is similar to the card reader 55 described in association with the earlier embodiments 210 and 310 and performs the task of reading whatever entry card is used as a door key and delivering the card identity information to the controller 418.

The local paging unit 416 will include a local paging receiver 417 designed to receive wireless transmissions from the main paging transmitter 412 and to decode the information signal which provides card identify information specifying what entry cards are to be allowed door or room access. This local paging receiver will be similar in structure to the paging receivers carried by many, businessmen and others but need not visually display the card identity information at the receiver 417.

The controller 418 is electrically connected to receive information from the entry card reader 410 and from the local paging receiver 417, and the controller processes and compares the information. The controller generates a lock actuation signal when it determines that an entry card 408 being read by the entry card reader 410 matches an approved card whose data has been received by the local paging receiver 417.

The controller 418 will generally include an associated memory for storing information received from the paging unit 416, allowing all such stored information to be continually available at each controlled door. Such memory will contain sufficient capacity for retention of all entry card indicia needed to recognize every entry card authorized to operate the lock 403 at each door 402.

The controller 418 is electrically connected with the card reader 410 to allow the card reader to pass information to the controller concerning each entry card 408 read by the card reader 410. The controller 418 is also designed and structured to compare the card identity information received from each entry card 408 read by the card reader with the list of approved entry cards stored in the memory. When the entry card 408 presented to open the lock 403 matches approved card identity information stored in the memory, the controller 418 generates a lock actuation signal which is delivered to a door lock release apparatus 421 described hereafter.

While it is necessary to have a local controller 418 which has memory and processing capability as described herein, it should be understood that the controller need not be an independent or distinct component. The memory function and the function of comparing card data stored in memory with a specific entry card, need not be contained in a discrete controller module. For example, either the entry card reader or the local paging unit could be constructed with adequate memory to retain all required data and can include appropriate electronic chips to compare and process the data. The term, controller, is intended to encompass all such variations, and such variations are within the purview of the invention. Accordingly, it should be understood that the term controller encompasses the structures needed to achieve the described results whether the components are isolated from the card reader and from the paging unit or whether certain of the components are supplied as part of the card reader or paging unit. It is, of course, known to have paging receivers with associated memory which will store multiple incoming messages until such messages are reviewed and erased. The use of such a memory, even if associated with the paging unit or with the card reader serves as a control element as described in association with controller 418 and is considered to be a controller within the scope of the invention.

The lock release apparatus 421 will typically be a solenoid which is mounted in or adjacent the door jamb 405 of the door 402 to release a moveable keeper plate and thereby allow release of the door's locking bolt, permitting the door to be opened. Such door solenoids are well known to the art. Alternatively, the door lock release apparatus could be incorporated within and associated with the door lock and mounted on the door itself. It should be understood that any device which may be activated by an electric current to open the door lock may be utilized as a lock release apparatus and is within the scope of the invention.

The door 402 is preferably equipped with a conventional closure device 420 to mechanically close the door each time it is opened by an entrant. Any closure device known to the art may be used. Such a closure device is desirable to assure that the door always returns to a fully closed position within its jamb and with its locking bolt lockably engaging the strike plate. Without such a closure device, the door would need to be reclosed and latched by each entrant to assure control of the door.

Each door control unit 409 is preferably energized by a replaceable battery 430, thereby allowing the door control unit to be operative even during utility power failures and retaining the door controller memory during such power failures. In addition, since each door control unit receives its commands and instructions by wireless radio transmission, no hardwiring needs to be installed between the door-control unit 409 and the control system 404. Use of battery power eliminates any need to connect the door control units 409 to the central electrical system of the facility and thus reduces wiring and installation costs. If desired, however, the door control units could utilize standard power obtained from conventional AC sources and converted as necessary through a transformer or converter to power the door control unit.

The control system 404 and the door control unit 409 may also be provided with an emergency override feature, which allows a specific override signal to be transmitted on command from the control system 404 through the main paging transmitter 412 in case of fire, medical emergency or the like. Such an override signal would actuate the override feature of door control until 409 to immediately unlock the lock 403 to allow unrestricted access to each door 402 receiving the override signal. Such an override can assure immediate access to fire emergency crews when needed and avoid situations where fire crews must destroy the door to obtain entry or face delays which endanger life or increase fire damage. The system is also advantageous in that since no wires extend between individual doors 402 and the control system 404, any fire occurring between the control system and the doors will not destroy control wiring and will not prevent normal functioning of the lock control apparatus 400.

The entry card used with the door control apparatus 400 may be of any now known or hereafter developed type so long as the entry card reader is matched to read it. Cards utilizing magnetic memory are well adapted to this system but other cards such as perforated cards which are optically or mechanically read may be utilized. If desired, the card may be a general purpose credit card issued by a credit card company, but virtually any machine readable entry card may be used with the invention.

The lock control apparatus 400 is well suited for use in moderate security and high security buildings, as well as research laboratories, universities, government buildings, commercial buildings, apartments and hotels where many doors need to be controlled and where access is obtained by entry card. Using the main paging transmitter 412 and the control system 404, an operator can quickly program the door control unit 409 of any door to accept additional or new entry cards or to reject expired or no longer approved cards. Entry cards can be issued in groups or families which are authorized to access a group or family of doors. Certain of the cards in the family can be authorized to access additional doors by simply programming the door control units at such additional doors to accept specific cards. The main paging transmitter 412, the described local paging receiver 417 and the paging technology they utilize are particularly well adapted to relay the card identity information and other information described herein with minimal error and transmission difficulties.

The invention is particularly well adapted to allow expansion of the areas and doors controlled. Once a basic system is installed, additional rooms, areas and doors can be added simply by installing additional door control units 409 and lock release apparatuses 421 at each new door and adding additional instructions and data to the software 406. No wiring needs to be installed between the newly added door control units and the control system 404, and consequently a building's walls, ceilings and floors need not be cut, drilled or broken or its esthetic decor sacrificed to install control wiring.

Figure 7:
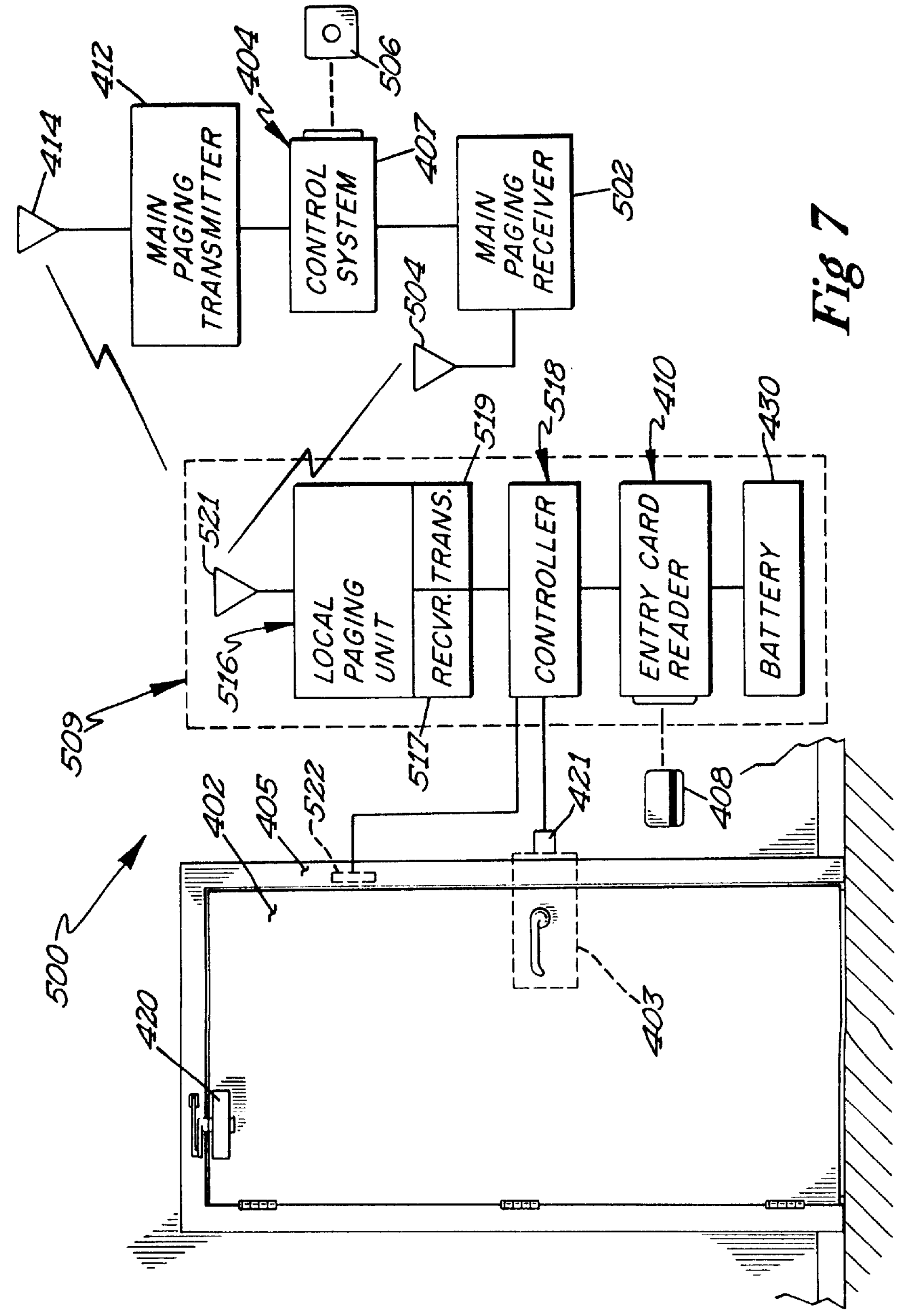
FIG. 7 is a block diagram of a door lock control apparatus embodying the invention and utilizing two-way paging by which information may be transmitted to and from the door lock, and by which the multiple doors of a facility may be controlled by a central control system.

Referring now to FIG. 7 a further embodiment 500 of a door control apparatus is shown which utilizes two way paging technology. Two-way paging devices are now commercially available and allow both traditional one-way paging and also allow the recipient or destination of such paging to transmit a wireless response. This wireless response is received by a paging receiver and may then be utilized. Such two-way paging devices are utilized with the embodiment 500 to allow the door control unit 509 to transmit data to the control system 404 so as to disclose the content of the memory of controller 518 and to report other conditions at the door control unit to the control system.

Referring now to FIG. 7, embodiment 500 is similar to already described embodiment 400 of FIG. 6 and components of the embodiment 500 which are substantially identical to those described in detail in association with embodiment 400 are numbered identically to those of embodiment 400 and will not be described in detail.

The embodiment 500 utilizes a control system 404 having a computer 407 identical to that disclosed in association with the embodiment 400. The control system 404 will include appropriate software 506 for the computer to allow the control system to accomplish the tasks described herein. The control system is operatively connected to main paging transmitter 412 and antenna 414 as described earlier. The control system 404 is also operatively connected with a main paging receiver 502 having an antenna 504, the receiver 502 being used to receive paging transmissions which will originate from one or more door control units 509, as described further hereafter. While the embodiment 500 has been shown as having a separate main paging transmitter 412 and a separate main paging receiver 502, it should be understood that the receiver and transmitter can be combined as a transceiver, and such an alternative is within the purview of the invention. In addition, the transceiver may have two antennas or function with a single antenna, and such variations are within the scope of the invention.

Referring again to FIG. 7 the door 402 has a door jamb 405 and is provided with a conventional mechanical closure device 420 and a door lock 403. A suitable lock release apparatus 421 may be mounted in the jamb 405 or may be incorporated in the lock 403.

If desired, a door position sensor 522 may be installed in the door jamb or door to detect the door 402 being in a fully closed position within the door jamb. The sensor may be a reed switch or other known device and is electrically connected with the door control unit 509 whose controller 518 may include a circuit for monitoring the sensor 522 as discussed further hereafter.

The door control unit 509 utilizes an entry card reader 410 like that described earlier and will utilize the same entry cards 408 discussed in association with the embodiment 400. The door control unit 509 differs from unit 409 in that the local paging unit 516 includes both a local paging receiver 517 and local paging transmitter 519. The paging transmitter 519 utilizes paging technology to wirelessly transmit data to the main paging receiver 502 for delivery of the data to the control system 404.

Although the unit 516 is illustrated in FIG. 7 as having a separate paging receiver 517 and separate paging transmitter 519, it should be understood that the receiver and transmitter may be combined if desired as a two-way paging transceiver, and such combination can be used with the invention and is within its scope. The receiver 517 and transmitter 519 may utilize separate antennas or share a common antenna, 521 as shown in FIG. 7.

The door control unit 509 includes a controller 518, the controller having a memory connected to receive data from the entry card reader 410 and from local paging receiver 517. The controller 418 includes circuitry or software to compare the card identity information obtained from card reader 410 with the card identify information associated with the authorized cards identified by the local paging receiver 517. When the controller 418 confirms that an entry card 408 read by the card reader 410 is an authorized card for the door 402, it generates a lock actuation signal which is delivered to the door lock release apparatus 421 to open the lock.

The memory of controller 518 may also be utilized to retain data from door position sensor 522 so as to always have data indicating whether the door is fully closed in the jamb where its lock 403 is engaged with a strike plate. If desired, the controller may be programmed to cause local paging transmitter 519 to transmit a warning to the main paging receiver 502 for delivery to the control system 404 indicating that the door 402 is not closed and locked properly and needs inspection.

The controller 518 will also include the override feature described in association with embodiment 400 to allow the lock actuation device to be activated in response to an open command by the control system 404. In addition the controller will monitor the condition of the battery 430 that energizes the door control unit 509. When a weak battery is detected, the controller will send a warning message to the control system 404 using wireless transmission from local paging transmitter 519 to main paging receiver 502.

It should be understood that while the memory has been described as being associated with the controller 518 that the memory could instead be combined with either the card reader 410 or the local paging unit 516, and such alternatives are within the purview of the invention.

Door control unit 509 may also be provided with a clock so that each time the controller's memory receives new information, the time of receipt can be associated therewith. In this way, the time at which each entry card 408 is detected by the entry card reader 410 can be entered in the memory.

The controller 518 may be structured and programmed to send certain data to the local paging transmitter 519 for wireless transmission to the main paging receiver 502 at regular intervals or when so instructed by a signal originating at the control system 404 and transmitted to the door control unit 509. Such data may include the content of the controller's memory. Allowing the control system 404 to have access to the controller memory will allow the control system or its operator to confirm that the proper entry cards are authorized and in memory at each door. The data can also include a history of which cards have been read by the card reader 410 during a predetermined time interval and even the times at which the cards were used for entry. The data may also include the status of the door lock, i.e. locked or unlocked, and the door position sensor's reading of whether the door 402 is fully closed. In addition, the data will include an indication of the battery's state of charge and whether battery replacement is needed. All this data may be transmitted in response to a specific command to do so, or the data may be transmitted periodically, as for example once or more per day.

The detailed description outlined above is considered to be illustrative only of the principles of the invention. Various changes and modifications will occur to those skilled in the art, and there is no intention to restrict the scope of the invention to the detailed description. The preferred embodiments of the invention having been described in detail, the scope of the invention will be defined by the following claims.

What is claimed is:

1. A door lock control apparatus for use at a facility having at least one door with a door lock thereon to control locking and unlocking of the door lock and actuated by an entry card carried by a cardholder and containing card identity information comprising:

a control system including a program containing the card identify information of the entry card;

a main paging transmitter operatively connected with said control system to receive the card identity information from said control system and to wirelessly transmit an information signal containing the card identify information to the door;

a door control unit, including:

an entry card reader positionable adjacent the door to read the entry card to obtain the card identity information;

a local paging unit positionable adjacent the door and including a local paging receiver for receiving said information signal from said main paging transmitter by wireless communication therewith;

a controller electrically connected with said local paging unit and including a memory to store card identity information received from said local paging unit, said controller electrically connected with said entry card reader to receive card identity information from said entry card reader and compare the card identity information obtained from said card reader with the entry card identity information received from said local paging unit and generate a lock actuation signal when said entry card read by said card reader is authorized to unlock the door lock; and a door lock release apparatus positionable adjacent the door and electrically connected to said door control unit to receive said lock actuation signal and to actuate the door lock upon receiving said lock actuation signal from said door control unit so as to unlock the door lock and allow access to the cardholder.

2. The door lock control apparatus of claim 1 wherein said door control unit includes an override feature which in response to an open command from said control system transmitted through said main paging transmitter, actuates said door release apparatus to place the door lock in an unlocked condition, whereby the door may be opened without an entry card, thereby allowing undelayed access to emergency personnel.

3. The door lock control apparatus of claim 1 wherein:

said local paging unit includes a door paging transmitter so as to allow wireless radio transmission of door lock information from said local paging unit, and said door lock control apparatus further includes a main paging receiver to receive said door lock information from said door paging transmitter, said main paging receiver being electrically connected to said control system deliver said door lock information to said control system.

4. The door lock control apparatus of claim 3 and further including a door position sensor positioned adjacent the door to detect the door being in a closed position, said door control unit being operatively electrically connected to said door position senor and generating door closure data for transmission by said door paging transmitter to allow wireless transmission of said door closure data to said main paging receiver for delivery to said control system to indicate whether the door is in closed position.

5. The door control apparatus of claim 3 wherein said door control unit includes a clock for associating the time at which the entry card is read by said entry card reader.

6. The door control apparatus of claim 3 wherein said door control unit includes a battery operatively electrically connected to energize said door control unit.

7. The door control apparatus of claim 6 wherein said door control unit includes a battery monitor to detect when said battery requires replacement and to generate a replace battery signal for wireless transmission by said local paging transmitter.

8. A door control unit useable at a facility having a door with a door lock and a lock release apparatus, by a cardholder carrying an entry card containing card identity information and wherein the facility has a control system with a program containing the card identity information and also has a main paging transmitter connected to the control system for wirelessly transmitting an information signal containing the card identity information to the door, the door control unit comprising:

an entry card reader positionable adjacent the door to read the entry card to obtain the card identity information;

a local paging unit positionable adjacent the door and including a local paging receiver for receiving said information signal from said main paging transmitter by wireless communication therewith;

a controller electrically connected with said local paging unit and including a memory to store card identity information received from said local paging unit, said controller electrically connected with said entry card reader to receive card identity information from said entry card reader, said controller comparing the card identity information obtained from said card reader with the entry card identity information received from said local paging unit and generating a lock actuation signal for delivery to the door lock release apparatus when the entry card read by said cardholder is authorized to unlock the door lock.

9. A door lock control apparatus for use at a facility having at least one door in order to lock and unlock a door lock on the door, comprising:

a main paging transmitter for wirelessly transmitting an information signal to the door;

a door control unit, including a paging unit positionable adjacent the door, said paging unit including a local paging receiver for receiving said information signal from said main paging transmitter by wireless communication therewith, said door control unit generating a lock actuation signal in response to receiving said information signal; and a door lock release apparatus positionable adjacent the door, and electrically connected to said door control unit to actuate the door lock between open and locked conditions in response to said lock actuation signal from said local paging unit.

10. The door lock control apparatus of claim 9 wherein the facility has a multiplicity of doors with a door lock on each door, said apparatus further including:

a control system including a program containing identifying indicia specific to each of said multiplicity of doors, said control system operatively connected to said main paging transmitter cause said transmitter to send information signals to doors; and a multiplicity of said door control units, a said door control unit positionable adjacent each of said doors comprising said multiplicity of doors.

11. The door lock control apparatus of claim 9 and further including:

a main paging receiver for receiving door lock information; and said door control unit further including a local paging transmitter for wirelessly transmitting door lock information to said main paging receiver to indicate conditions at the door lock.

12. The door lock control apparatus of claim 9 wherein said door control unit includes a battery operatively electrically connected to energize said local paging receiver and said door release apparatus.

* * * * *